US009847814B2

(12) United States Patent
Nakano et al.

(10) Patent No.: US 9,847,814 B2
(45) Date of Patent: Dec. 19, 2017

(54) ELECTRONIC APPARATUS AND TRANSMISSION SYSTEM

(71) Applicant: Sony Corporation, Tokyo (JP)

(72) Inventors: Hiroaki Nakano, Tokyo (JP); Shinichi Fukuda, Kanagawa (JP); Osamu Kozakai, Kanagawa (JP); Kenichi Fujimaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 886 days.

(21) Appl. No.: 14/355,150

(22) PCT Filed: Oct. 19, 2012

(86) PCT No.: PCT/JP2012/077667
§ 371 (c)(1),
(2) Date: Apr. 29, 2014

(87) PCT Pub. No.: WO2013/069472
PCT Pub. Date: May 16, 2013

(65) Prior Publication Data
US 2014/0312709 A1    Oct. 23, 2014

(30) Foreign Application Priority Data

Nov. 8, 2011 (JP) ................ 2011-244320

(51) Int. Cl.
| H01F 27/42 | (2006.01) |
| H04B 5/00 | (2006.01) |
| H02J 5/00 | (2016.01) |
| H02J 7/02 | (2016.01) |

(52) U.S. Cl.
CPC ........... *H04B 5/0037* (2013.01); *H02J 5/005* (2013.01); *H02J 7/025* (2013.01)

(58) Field of Classification Search
None
See application file for complete search history.

(56) References Cited

U.S. PATENT DOCUMENTS 4,641,126 A * 2/1987 Crowe ............... H04B 1/74
340/12.33
6,737,984 B1 * 5/2004 Welles, II ............ H04Q 9/00
340/12.33

(Continued)

FOREIGN PATENT DOCUMENTS

CN    1297600    5/2001
EP    1 096 641    5/2001
(Continued)

OTHER PUBLICATIONS

Japanese Office Action dated Jul. 8, 2015, for corresponding Japanese Appln. No. 2011-244320 (13 pages).
(Continued)

*Primary Examiner* — Cassandra Cox
(74) *Attorney, Agent, or Firm* — K&L Gates LLP

(57) ABSTRACT

An electronic apparatus includes a switch control section configured to: determine whether a received signal is any one of a power signal and a data signal based on the received signal, and select any one of a power-reception operation and a data-transmission operation based on the determination of the received signal.

27 Claims, 8 Drawing Sheets

(56) References Cited

U.S. PATENT DOCUMENTS

| | | | |
|---|---|---|---|
| 8,199,946 B2 * | 6/2012 | Ritter | H04R 25/554 |
| | | | 381/314 |
| 2003/0069051 A1 | 4/2003 | Pretre et al. | |
| 2012/0316691 A1 * | 12/2012 | Boardman | H02J 3/26 |
| | | | 700/293 |
| 2014/0312709 A1 * | 10/2014 | Nakano | H02J 5/005 |
| | | | 307/104 |

FOREIGN PATENT DOCUMENTS

| | | |
|---|---|---|
| EP | 2 348 600 | 7/2011 |
| EP | 2 367 262 | 9/2011 |
| JP | S61-101886 A | 5/1986 |
| JP | 11-066031 | 3/1999 |
| JP | 2003-198400 | 7/2003 |
| JP | 2006-246595 | 9/2006 |
| JP | 2008-206296 A | 9/2008 |
| JP | 2010-284065 A | 12/2010 |
| JP | 2011-029799 | 2/2011 |
| JP | 2011-062008 | 3/2011 |
| JP | 2011-154435 | 8/2011 |
| JP | 2014-504495 | 2/2014 |
| WO | 2009/156581 | 12/2009 |
| WO | 2011/127448 | 10/2011 |

OTHER PUBLICATIONS

Office Action received in CN Application 2012800539444, dated Dec. 11, 2015 (24 pages).

\* cited by examiner

[ FIG. 1 ]
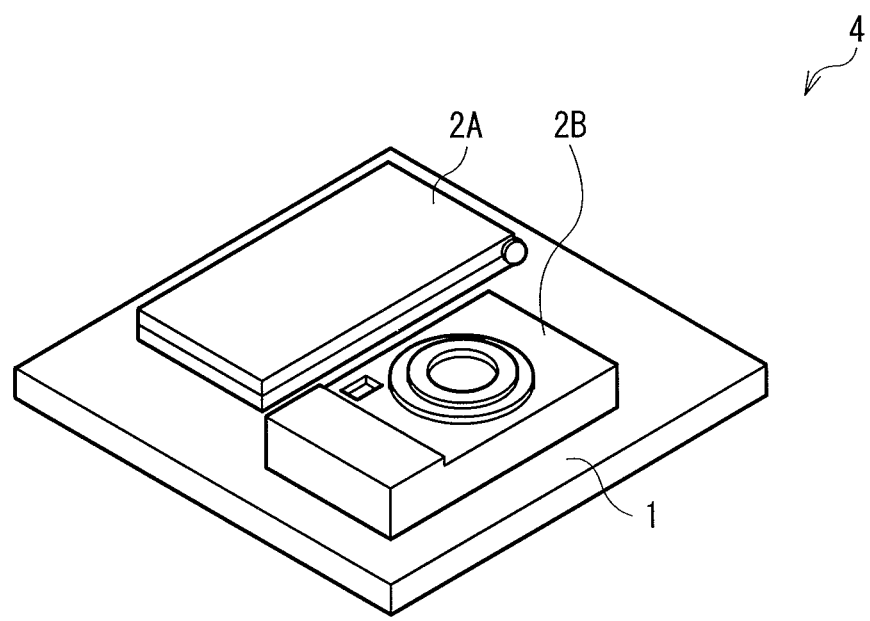

[FIG. 2]
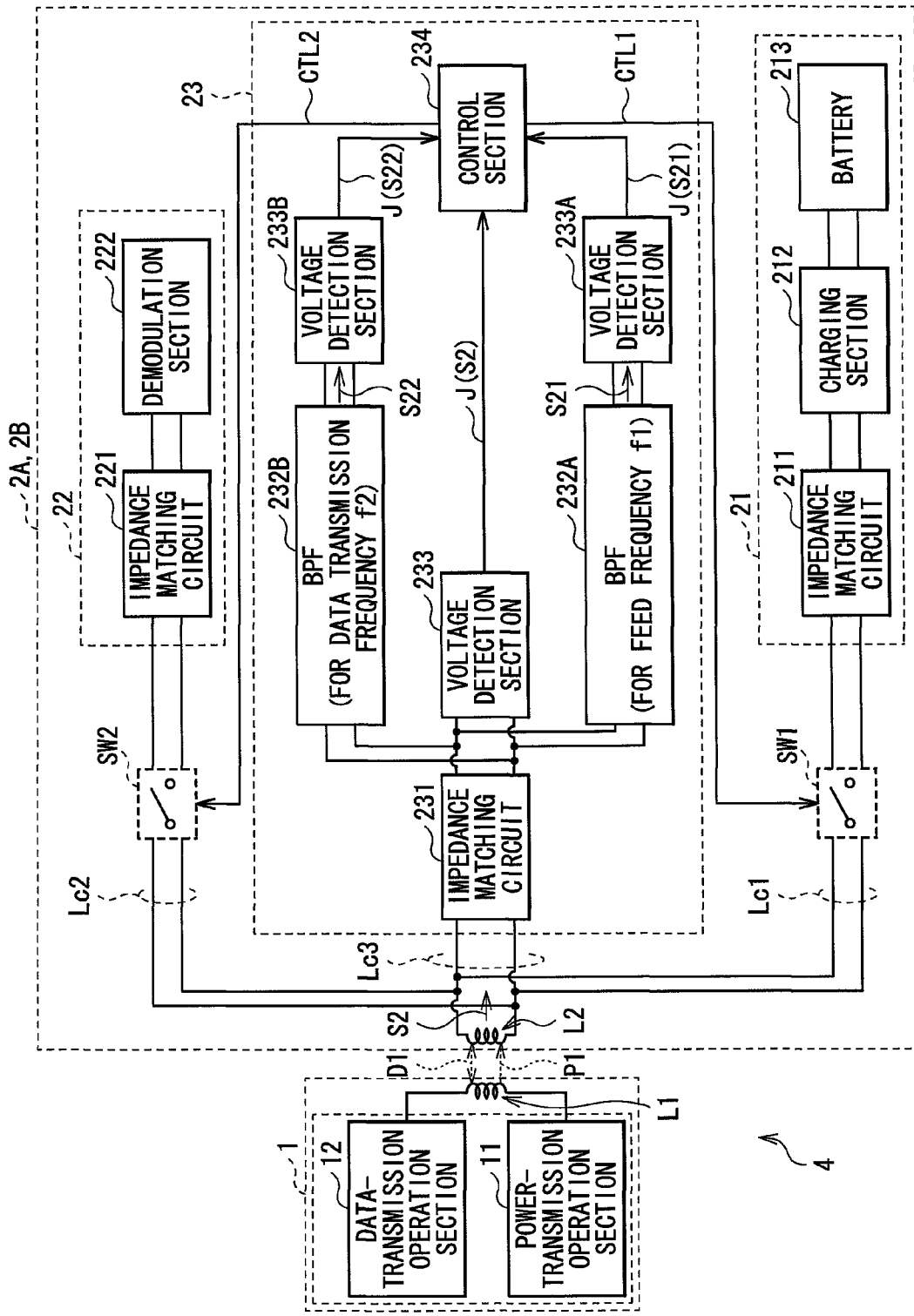

[ FIG. 3 ]
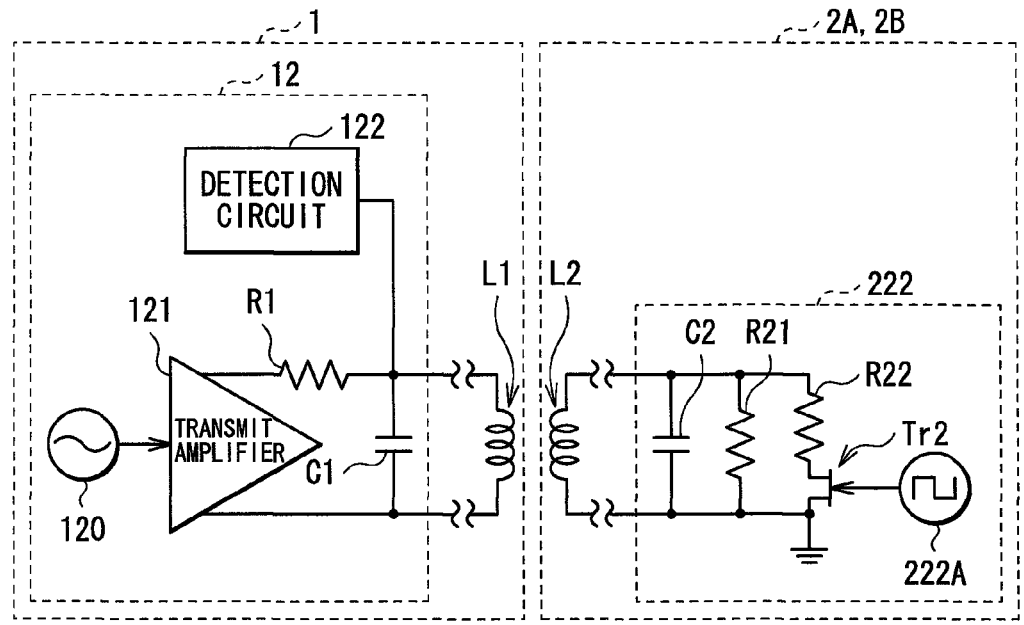
[ FIG. 4 ]
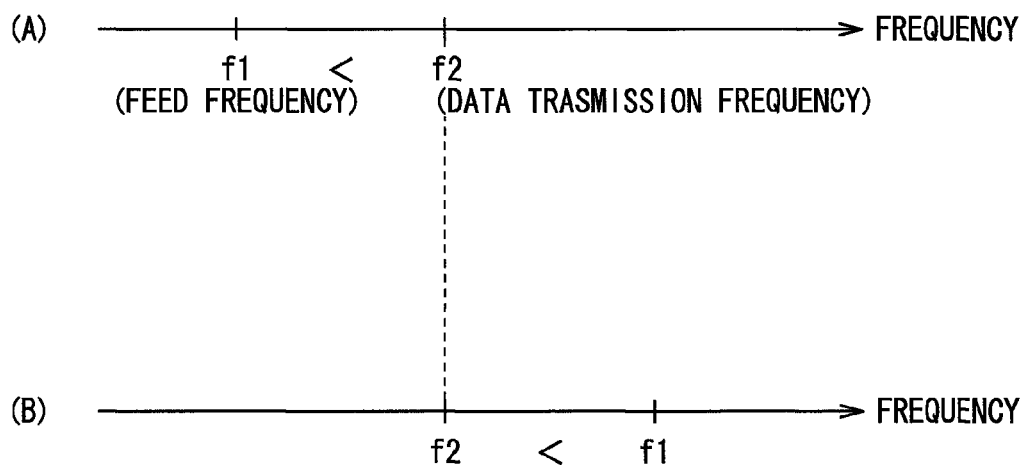

[ FIG. 5A ]
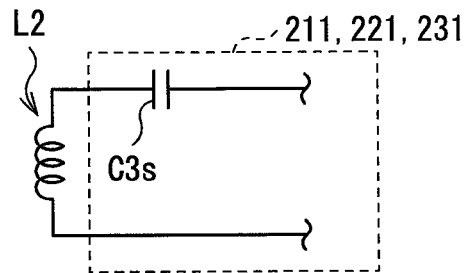
[ FIG. 5B ]
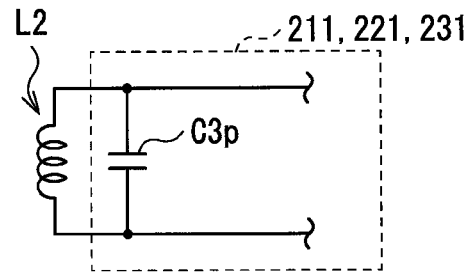
[ FIG. 5C ]
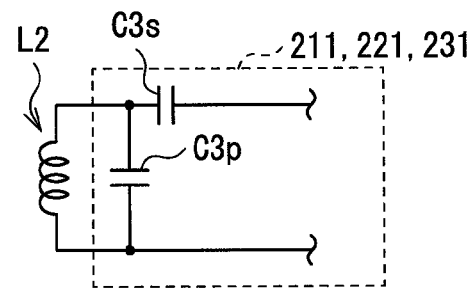
[ FIG. 5D ]
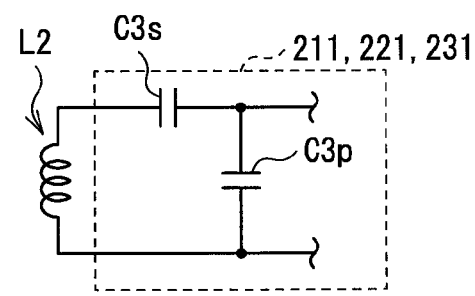

[ FIG. 6A ]
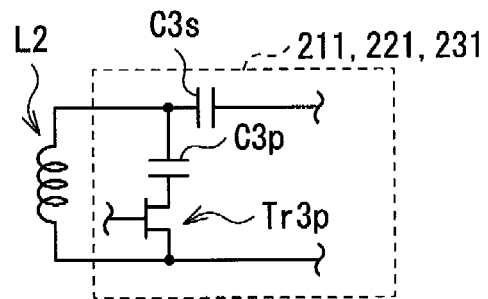
[ FIG. 6B ]
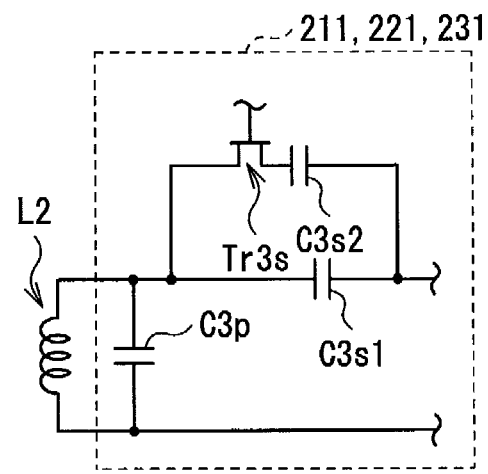
[ FIG. 6C ]
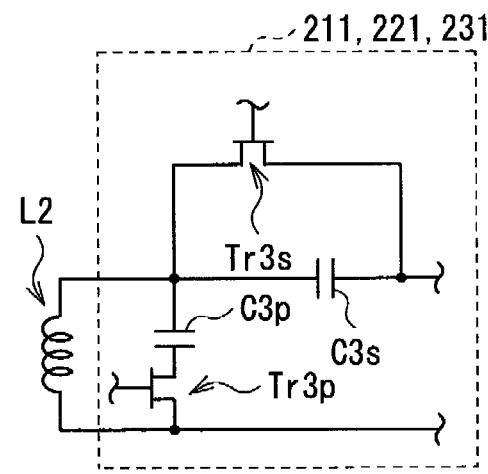

[ FIG. 7 ]
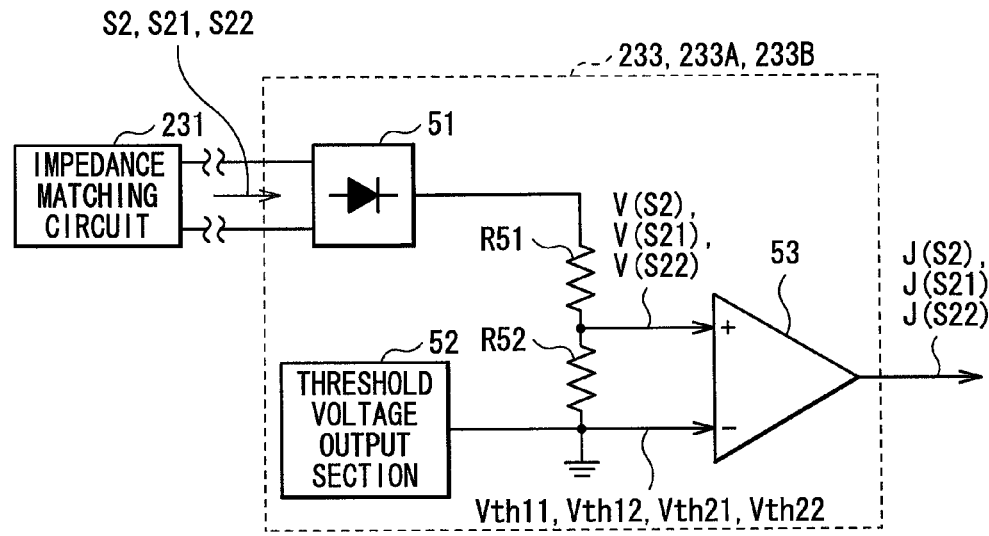
[ FIG. 8 ]
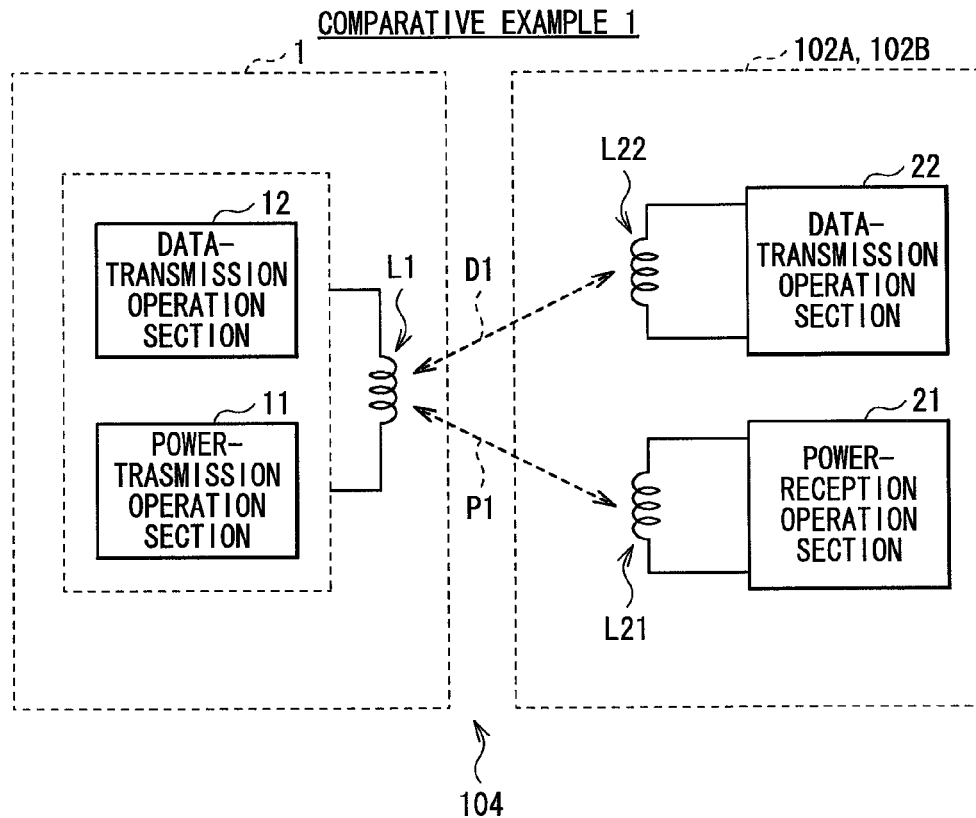

[ FIG. 9 ]
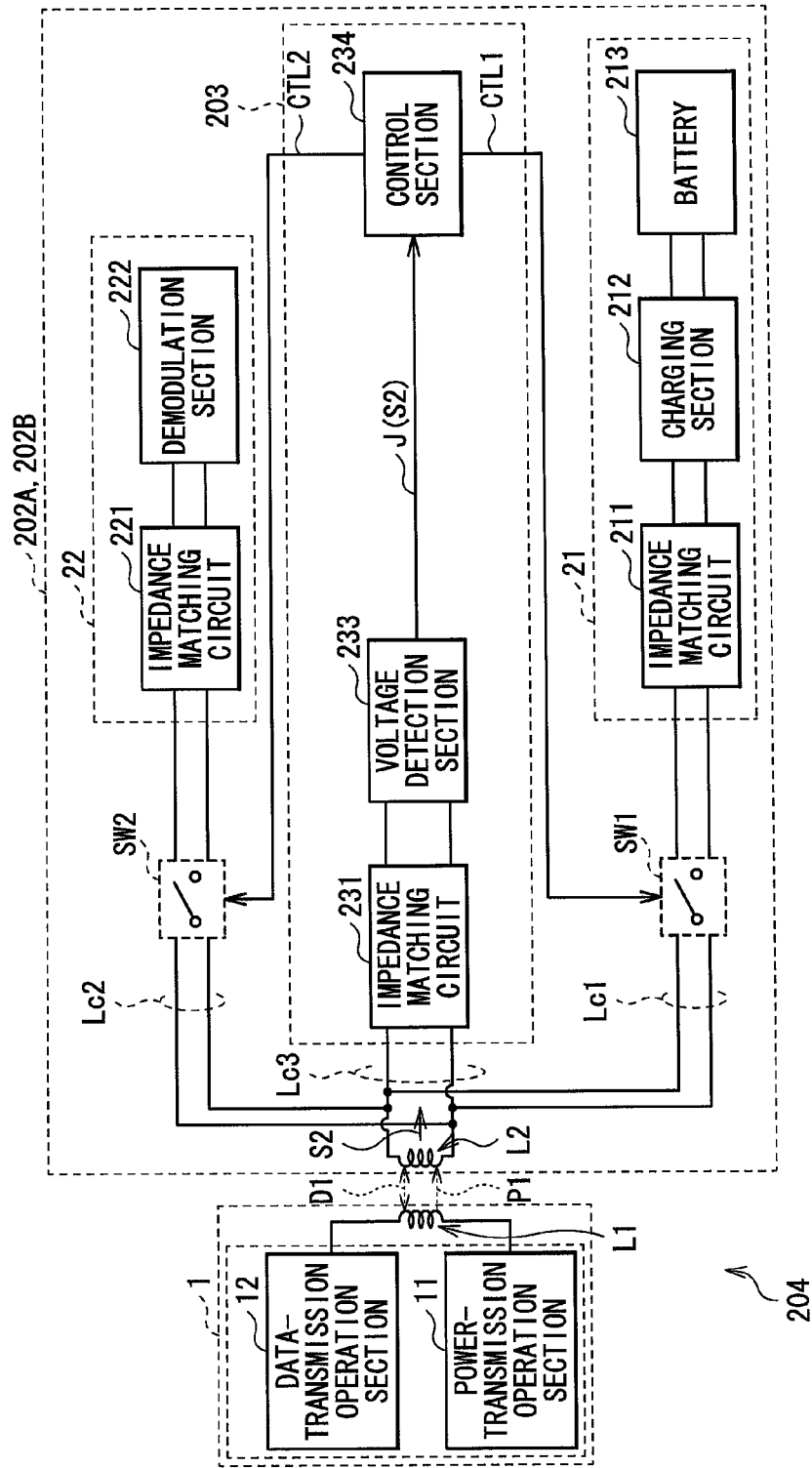

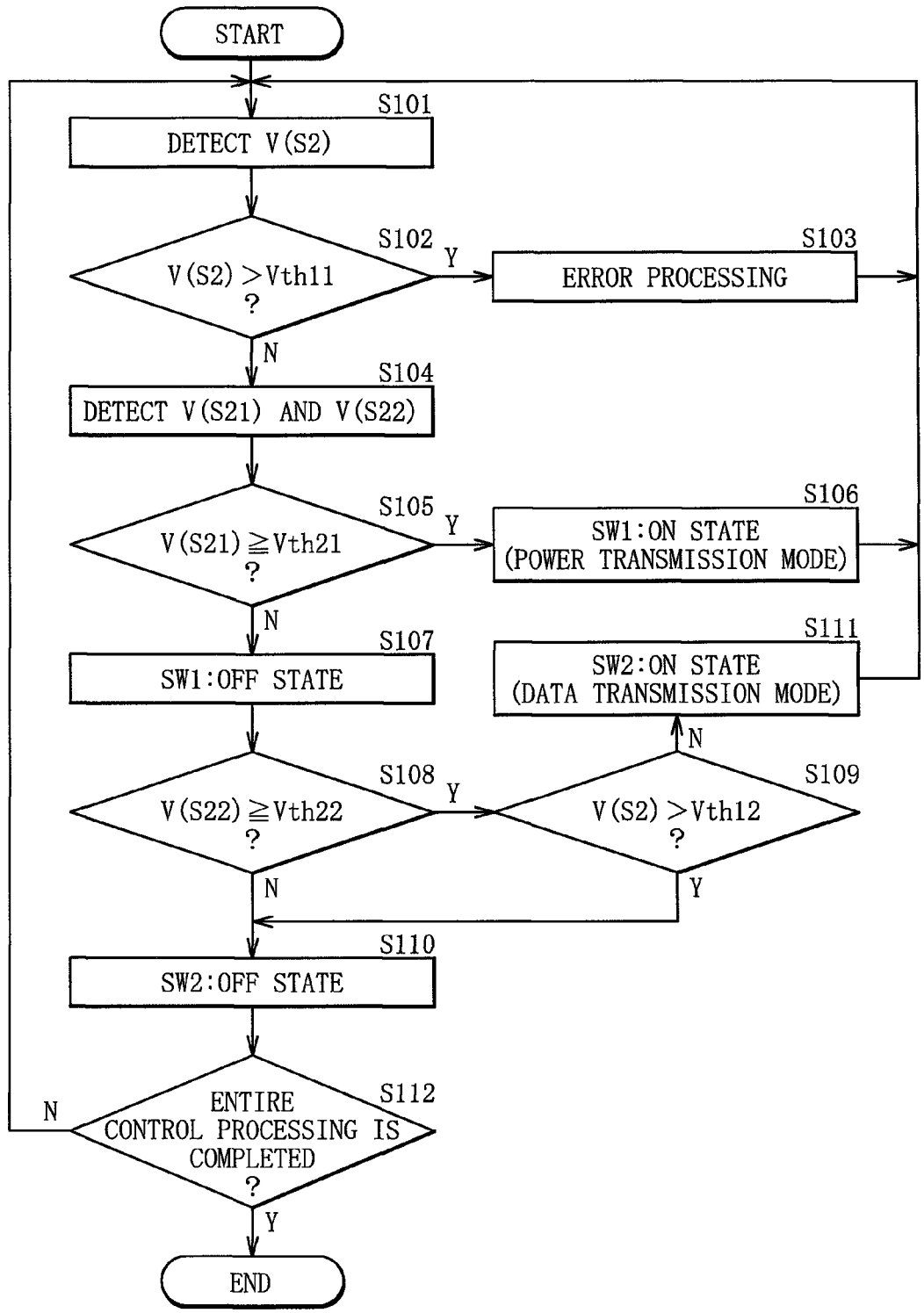
[ FIG. 10 ]

ELECTRONIC APPARATUS AND TRANSMISSION SYSTEM

CROSS REFERENCES TO RELATED APPLICATIONS

The present application is a national stage of International Application No. PCT/JP2012/077667 filed on Oct. 19, 2012 and claims priority to Japanese Patent Application No. 2011-244320 filed on Nov. 8, 2011, the disclosure of which is incorporated herein by reference.

BACKGROUND

The present disclosure relates to a transmission system performing non-contact power transmission and non-contact data transmission (power feeding and communication) with use of a magnetic field, and to an electronic apparatus (apparatus to be fed with power, power receiver) applied to such a transmission system.

In recent years, a feed system (a non-contact feed system, a wireless charging system) performing non-contact power supply (power transmission) to CE devices (consumer electronics devices) such as mobile phones and mobile music players has attracted attention. Accordingly, charging is allowed to be started by not inserting (connecting) a connector of a power supply such as an AC adapter into a unit but placing an electronic apparatus (a secondary-side unit) on a charging tray (a primary-side unit). In other words, terminal connection between the electronic apparatus and the charging tray is not necessary.

The methods of performing non-contact power supply in such a way are largely classified into two kinds of techniques. The first technique is a well-known electromagnetic induction system. In the electromagnetic induction system, a degree of coupling between a power transmission side (a primary side) and a power reception side (a secondary side) is extremely high so that feeding is achievable with high efficiency. The second technique is a so-called magnetic resonance system which has characteristics that a magnetic flux shared by the power transmission side and the power reception side may be reduced by actively using resonance phenomenon.

In addition, as a communication method (data transmission method) having a principle similar to the above-described non-contact power transmission, there is an NFC (near field communication). The NFC is an international standard of wireless communication, and is a wireless communication technology consuming less power. Moreover, the NFC is also an example of the standard in RFID (radio frequency identification, individual identification by radio) technology used mainly in transport facilities and the like in Japan (for example, a standard limited at a used frequency of 13.56 MHz).

The transmission system incorporating both the non-contact power transmission system and the non-contact data transmission system (with use of a magnetic field) is proposed in, for example, Patent Literatures 1 to 3.

CITATION LIST

Patent Literature

PTL 1: Japanese Patent Application Unexamined Publication No. 2011-172299
PTL 2: Japanese Patent Application Unexamined Publication No. 2010-284065
PTL 3: Japanese Patent Application Unexamined Publication No. 2005-202721

SUMMARY

In the transmission system in any of Patent Literatures 1 to 3, a power reception coil and a data transmission coil are common as a single coil. Therefore, the number (kinds) of coils is allowed to be reduced, and cost reduction and downsizing are achievable. However, it is desirable that the difficulty caused by the difference between the two systems (the power transmission system and the data transmission system) be solved and safety be improved.

Accordingly, it is desirable to provide an electronic apparatus and a transmission system which are capable of improving safety while achieving cost reduction and downsizing at the time of performing power transmission and data transmission with use of a magnetic field.

An electronic apparatus includes a switch control section configured to: determine whether a received signal is any one of a power signal and a data signal based on the received signal, and select any one of a power-reception operation and a data-transmission operation based on the determination of the received signal.

In another embodiment, a method of routing a received wireless signal based on a frequency is provided. The method includes: receiving a signal wirelessly from a feed unit via magnetic inductance; applying a first filter to the received signal to generate a first frequency component; applying a second filter to the received signal to generate a second frequency component; routing the received signal to a power-reception operation section if a magnitude of the first frequency component exceeds a first voltage threshold; and routing the received signal to a data-transmission operation section if a magnitude of the second frequency component exceeds a second voltage threshold.

In another embodiment, an electronic system includes: a transmitter configured to wirelessly transmit a power signal and a data signal; an electronic device wirelessly communicatively coupled to the transmitter, the electronic device including: a switch control section to: determine whether a signal received from the transmitter is the power signal or the data signal based on a frequency component of the received signal; and select any one of a power-reception operation and a data-transmission operation based on the determination of the received signal. In an embodiment, the electronic device includes an induction coil that is electromagnetically coupled to a second induction coil included within the transmitter.

In the electronic apparatus and the transmission system according to the embodiments of the disclosure, with use of the common coil, the power transmitted through the power transmission with use of a magnetic field is received, and the mutual data transmission with use of a magnetic field is performed. In other words, since both the power reception operation and the data transmission operation are performed with use of the single common coil, the number (kinds) of coils is allowed to be reduced, compared with the case where these operations are performed with use of dedicated coils (a power reception coil and a data transmission coil). In addition, the switching control of ON/OFF state of each of the first changeover switch on the path between the common coil and the power-reception operation section and the second changeover switch on the path between the common coil and the data-transmission operation section is performed based on the detection results with taking account of the frequency components of the signal received by the common coil from the outside (the feed unit). Accordingly, the circuit (the circuit in the above-described data-transmission operation section, and the like) is prevented from being damaged by the difference between the system configuration at the time of the power transmission and the system configuration at the time of the data transmission.

In the electronic apparatus and the transmission system according to the embodiments of the disclosure, with use of the common coil, the power transmitted through the power transmission with use of a magnetic field is received, and the mutual data transmission with use of a magnetic field is performed. Therefore, the number (kinds) of coils is allowed to be reduced and cost reduction and downsizing are achievable. In addition, the switching control of ON/OFF state of each of the first changeover switch on the path between the common coil and the power-reception operation section and the second changeover switch on the path between the common coil and the data-transmission operation section is performed based on the detection results with taking account of the frequency components of the signal received by the common coil from the outside (the feed unit). Accordingly, the circuit is prevented from being damaged by the difference between the system configuration at the time of the power transmission and the system configuration at the time of the data transmission, thereby enhancing safety. As a result, at the time of performing power transmission and data transmission with use of a magnetic field, the safety is allowed to be improved while achieving cost reduction and downsizing.

Additional features and advantages are described herein, and will be apparent from the following Detailed Description and the figures.

DESCRIPTION OF THE FIGURES

FIG. 1 is a perspective view illustrating a configuration example of an appearance of a transmission system according to an embodiment of the disclosure.

FIG. 2 is a block diagram illustrating a detailed configuration example of the transmission system illustrated in FIG. 1.

FIG. 3 is a circuit diagram illustrating a detailed configuration example of a data transmission section and a demodulation section illustrated in FIG. 2.

FIG. 4 is a schematic diagram for explaining a relationship between a feed frequency and a data-transmission frequency.

FIGS. 5A to 5D are circuit diagrams each illustrating an example of an impedance matching circuit illustrated in FIG. 2.

FIGS. 6A to 6C are circuit diagrams illustrating other examples of the impedance matching circuit illustrated in FIG. 2.

FIG. 7 is a circuit diagram illustrating a detailed configuration example of a voltage detection section illustrated in FIG. 2.

FIG. 8 is a block diagram illustrating a configuration example of a transmission system according to a comparative example 1.

FIG. 9 is a block diagram illustrating a configuration example of a transmission system according to a comparative example 2.

FIG. 10 is a flowchart illustrating an example of a switching control operation by a switch control section illustrated in FIG. 2.

DETAILED DESCRIPTION

An embodiment of the present disclosure will be described in detail below referring to the accompanying drawings. Note that descriptions will be given in the following order.
1. Embodiment (Example in which changeover switches are controlled with taking account of frequency components of a signal in a secondary-side unit)
2. Modifications
[Embodiment ]
[General Configuration of Transmission System 4]

FIG. 1 illustrates a configuration example of an appearance of a transmission system (a transmission system 4) according to an embodiment of the disclosure, and FIG. 2 illustrates a block configuration example of the transmission system 4. The transmission system 4 is a system (a non-contact transmission system) performing non-contact power transmission and non-contact data transmission (power feed and communication) with use of a magnetic field (with use of magnetic resonance, electromagnetic induction, and the like; hereinafter the same). The transmission system 4 includes a feed unit 1 (a primary-side unit) and one or more electronic apparatuses (in this example, two electronic apparatuses 2A and 2B; secondary-side units) as units to be fed with power.

As illustrated in FIG. 1, for example, in the transmission system 4, the electronic apparatuses 2A and 2B are placed (or closely disposed) on a feeding surface (power transmission surface) of the feed unit 1 so that the feed unit 1 transmits power to the electronic apparatuses 2A and 2B with use of a magnetic field. In this case, in consideration of the case where power is transmitted to the plurality of electronic apparatuses 2A and 2B at the same time or in a time-divisional manner (sequentially), the feed unit 1 has a mat shape (a tray shape) in which an area of the feeding surface is larger than the size of the electronic apparatuses 2A and 2B to be fed with power. In addition, in the transmission system 4, when the feed unit 1 and the electronic apparatuses 2A and 2B are closer to each other, mutual data transmission (bidirectional wireless communication) with use of a magnetic field is performed between the feed unit 1 and the electronic apparatuses 2A and 2B.

(Feed Unit 1)

As described above, the feed unit 1 is a unit (a charging tray) transmitting power to the electronic apparatuses 2A and 2B with use of a magnetic field, and performing mutual data transmission with the electronic apparatuses 2A and 2B. As illustrated in FIG. 2, for example, the feed unit 1 includes a power-transmission operation section 11, a data-transmission operation section 12, and a common coil L1. Note that the common coil L1 is a coil commonly used as a power-transmission coil (a primary-side coil) and a data-transmission coil.

The power-transmission operation section 11 uses the common coil L1 to transmit power (perform power transmission operation) to the electronic apparatuses 2A and 2B with use of a magnetic field. Specifically, the power-transmission operation section 11 performs power transmission operation radiating a magnetic field (magnetic flux) from the feeding surface toward the electronic apparatuses 2A and 2B.

The data-transmission operation section 12 uses the common coil L1 to perform mutual data transmission with the electronic apparatuses 2A and 2B (specifically, a data-transmission operation section 22 described later) with use of a magnetic field. As illustrated in FIG. 3, for example, the data-transmission operation section 12 includes a signal supply source 120, a transmit amplifier 121, a detection circuit 122, a resistor R1, and a capacitor C1. The signal supply source 120 supplies predetermined signals for data transmission to the transmit amplifier 121. The detection circuit 122 is a circuit detecting presence of signals from the counter party (herein, the data-transmission operation section 22 described later) at the time of data transmission. A first end of the resistor R1 is connected to a first output terminal of the transmit amplifier 121, and a second end of the resistor R1 is connected to each of an output terminal of the detection circuit 122, a first end of the capacitor C1, and a first end of the common coil L1. A second end of the capacitor C1 is connected to a second output terminal of the transmit amplifier 121 and a second end of the common coil L1.

(Electronic Apparatuses 2A and 2B)

The electronic apparatuses 2A and 2B are stationary electronic apparatuses typified by a television receiver, mobile electronic apparatuses including a rechargeable battery (battery), typified by a mobile phone and a digital camera, and the like. As illustrated in FIG. 2, for example, each of the electronic apparatuses 2A and 2B includes a common coil L2, a changeover switch SW1 (a first changeover switch), a changeover switch SW2 (a second changeover switch), a power-reception operation section 21, the data-transmission operation section 22, and a switch control section 23.

The common coil L2 is a coil commonly used as a power-reception coil (a secondary-side coil) and a data-transmission coil. In other words, as illustrated by arrows P1 and D1 in FIG. 2, the common coil L2 receives power transmitted from the common coil L1 in the feed unit 1, and performs mutual data transmission with the common coil L1.

The power-reception operation section 21 uses the above-described common coil L2 to perform power-reception operation for receiving power transmitted through power transmission with use of a magnetic field, and includes an impedance matching circuit 211, a charging section 212, and a battery 213. The impedance matching circuit 211 is a circuit performing impedance matching at the time of power transmission to improve efficiency (transmission efficiency) at the time of power transmission. The charging section 212 performs charging with respect to the battery 213, based on power received by the common coil L2. The battery 213 stores power therein in response to the charging by the charging section 212, and is configured by using a rechargeable battery (a secondary battery) such as a lithium-ion battery. Note that the detailed configuration example of the impedance matching circuit 211 will be described later (FIGS. 5A to 5D and FIGS. 6A to 6C).

The data-transmission operation section 22 uses the common coil L2 to perform mutual data transmission with the data-transmission operation section 12 in the feed unit 1 with use of a magnetic field, and includes an impedance matching circuit 221 and a demodulation section 222. The impedance matching circuit 221 is a circuit performing impedance matching at the time of power transmission, similarly to the above-described impedance matching circuit 211. The detailed configuration example of the impedance matching circuit 221 will also be described later (FIGS. 5A to 5D and FIGS. 6A to 6C). The demodulation section 222 performs demodulation operation at the time of data transmission, and as illustrated in FIG. 3, for example, includes a capacitor C2, resistors R21 and R22, a transistor Tr2, and a signal supply source 222A. In the demodulation section 222, a first end of each of the capacitor C2 and the resistors R21 and R22 is connected to a first end of the common coil L2, and a second end of each of the capacitor C2 and the resistor R21 and a source of the transistor Tr2 are connected to a second end of the common coil L2 and grounded. A second end of the resistor R22 is connected to a drain of the transistor Tr2, and a gate of the transistor Tr2 is supplied with predetermined signals for demodulation operation from the signal supply source 222A.

The changeover switch SW1 is disposed on a path (a connection line Lc1) between the common coil L2 and the power-reception operation section 21. Switching of ON/OFF state of the changeover switch SW1 allows the connection state between the common coil L2 and the power-reception operation section 21 to be switched. The changeover switch SW2 is disposed on a path (a connection line Lc2) between the common coil L2 and the data-transmission operation section 22. Switching of ON/OFF state of the changeover switch SW2 allows the connection state between the common coil L2 and the data-transmission operation section 22 to be switched. Incidentally, each of the changeover switches SW1 and SW2 is configured by using a transistor, a MOSFET (metal-oxide-semiconductor field-effect transistor), and the like. The switch control section 23 is disposed on a first end side of a connection line Lc3. A second end side of the connection line Lc3 is connected to the common coil L2. The switch control section 23 uses control signals CTL1 and CTL2 to perform switching control of ON/OFF state of each of the above-described changeover switches SW1 and SW2. In the embodiment, the switch control section 22 performs the switching control of the changeover switches SW1 and SW2, based on detection results with taking account of frequency components of a signal (a carrier) S2 received by the common coil L2 from the outside (in this case, the feed unit 1). Specifically, the switch control section 23 performs such switching control based on a magnitude of a signal level (a voltage and the like) of each of a frequency component for power transmission and a frequency component for data transmission in the signal S2. Note that the detail of the switching control operation by the switch control section 23 will be described later (FIG. 10).

As illustrated in FIG. 2, for example, the switch control section 23 includes an impedance matching circuit 231, two BPFs (band path filters) 232A and 232B, three voltage detection sections 233, 233A, and 233B, and a control section 234. The impedance matching circuit 231 is a circuit performing an impedance matching at the time of power transmission, similarly to the above-described impedance matching circuits 211 and 221. Note that the detailed configuration example of the impedance matching circuit 231 will also be described later (FIGS. 5A to 5D, and FIGS. 6A to 6C).

The BPF 232A (a first filter) is a filter extracting a frequency component for power transmission (a component of a feed frequency f1) from the above-described signal S2, and outputting the extracted component as a signal S21. On the other hand, the BPF 232B (a second filter) is a filter extracting a frequency component for data transmission (a component of a data-transmission frequency f2) from the signal S2, and outputting the extracted component as a signal S22.

As illustrated in (A) and (B) of FIG. 4, the relationship between the feed frequency f1 and the data-transmission frequency f2 is as follows. The feed frequency f1 and the data-transmission frequency f2 are different from each other (f1≠f2), and as illustrated in (A) of FIG. 4, for example, the feed frequency f1 is lower than the data-transmission frequency f2 (f1<f2). Alternatively, as illustrated in (B) of FIG. 4, for example, the feed frequency f1 is higher than the data-transmission frequency f2 (f2<f1). Among them, although the detail will be described later, in consideration of the degree of the efficiency reduction (feed efficiency and the like) in a high frequency range, the case of (A) of FIG. 4 (f1<f2) is more preferable than the case of (B) of FIG. 4 (f2<f1). Incidentally, in the case of (A) of FIG. 4 (f1<f2), the feed frequency f1 is a frequency of about 120 kHz or about 6.78 MHz, for example, and the data transmission frequency f2 is 13.56 MHz, for example.

The voltage detection section 233 (a first detection section) detects a signal level (herein, a voltage) of the entire signal S2 (including all of the frequency components) to output a detection result signal J(S2). On the other hand, the voltage detection section 233A (a second detection section) detects a signal level (herein, a voltage) of the signal S21 (the component of the feed frequency f1 in the signal S2) extracted by the BPF 232A to output a detection result signal J(S21). In addition, the voltage detection section 233B (a third detection section) detects a signal level (herein, a voltage) of the signal S22 (the component of the data-transmission frequency f2 in the signal S2) extracted by the BPF 232B to output a detection result signal J(S22). Note that the detailed configuration example of the voltage detection sections 233, 233A, and 233B will be described later (FIG. 7).

The control section 234 generates and outputs the control signals CTL1 and CTL2, based on the detection result signals J(S2), J(S21), and J(S22) as the detection results by the voltage detection sections 233, 233A, and 233B, respectively, and accordingly performs switching control of each of the above-described changeover switches SW1 and SW2. Such a control section 234 is configured by using a microcomputer, for example.

[Detailed Configuration Example of Impedance Matching Circuits 211, 221, and 231]

FIGS. 5A to 5D and FIGS. 6A to 6C are circuit diagrams each illustrating a detailed configuration example of the above-described impedance matching circuits 211, 221, and 231.

In the example illustrated in FIG. 5A, in the impedance matching circuits 211, 221, and 231, a capacitor C3$s$ is connected in series with the common coil L2. In the example illustrated in FIG. 5B, in the impedance matching circuits 211, 221, and 231, a capacitor C3$p$ is connected in parallel with the common coil L2. In each of the examples illustrated in FIGS. 5C and 5D, in the impedance matching circuits 211, 221, and 231, the capacitor C3$s$ is connected in series with the common coil L2, and the capacitor C3$p$ is connected in parallel with the common coil L2.

On the other hand, in the examples illustrated in FIGS. 6A to 6C, transistors Tr3$s$ and Tr3$p$ for switching the connection state of the capacitor C3$s$ or C3$p$ are provided in the impedance matching circuits 211, 221, and 231. Specifically, in the example illustrated in FIG. 6A, in the impedance matching circuits 211, 221, and 231 illustrated in FIG. 5C, the transistor Tr3$p$ for switching the connection state of the capacitor C3$p$ is connected in series with the capacitor C3$p$. In the example illustrated in FIG. 6B, capacitors C3$s$1 and C3$s$2 each are connected in series with the common coil L2, the capacitor C3$p$ is connected in parallel with the common coil L2, and the capacitors C3$s$1 and C3$s$2 are connected in parallel with each other. In addition, the transistor Tr3$s$ for switching the connection state of the capacitor C3$s$2 is connected in series with the capacitor C3$s$2. In the example illustrated in FIG. 6C, in the impedance matching circuits 211, 221, and 231 illustrated in FIG. 5C, the transistor Tr3$p$ for switching the connection state of the capacitor C3$p$ is connected in series with the capacitor C3$p$. In addition, the transistor Tr3$s$ for switching the connection state of the capacitor C3$s$ is connected in parallel with the capacitor C3$s$. With such transistors Tr3$s$ and Tr3$p$ thus provided, the connection state of the capacitor C3$s$ or C3$p$ is switched in response to the ON/OFF state of the transistors Tr3$s$ and Tr3$p$, thereby enabling adjustment of the impedance matching.

[Detailed Configuration Example of Voltage Detection Sections 233, 233A, and 233B]

FIG. 7 is a circuit diagram illustrating the detailed configuration example of the above-described voltage detection sections 233, 233A, and 233B. In this example, each of the voltage detection sections 233, 233A, and 233B includes a rectification circuit 51, a threshold voltage output section 52, a comparator 53, and two resistors R51 and R52.

The rectification circuit 51 is a circuit rectifying the signal S2 (an AC signal) input from the common coil L2 through the impedance matching circuit 231, and accordingly outputting a signal converted from the AC voltage to the DC voltage. The threshold voltage output section 52 outputs one of four threshold voltages Vth11, Vth12, Vth21, and Vth22 which will be described later to input terminal on the negative (−) side of the comparator 53. The threshold voltage output section 52 includes a predetermined power supply circuit and the like. Each of the resistors R51 and R52 is a resistor dividing a DC voltage output from the rectification circuit 51. A first end of the resistor R51 is connected to an output terminal of the rectification circuit 51, and a second end of the resistor R51 is connected to a first end of the resistor R52 and an input terminal on the positive (+) side of the comparator 53. A second end of the resistor R52 is grounded. With this configuration, detection voltages V(S2), V(S21), and V(S22) as the detection voltages of the signals S2, S21, and S22 are supplied to the input terminal on the positive side of the comparator 53.

The comparator 53 is a circuit comparing a magnitude of one of the detection voltages V(S2), V(S21), and V(S22) supplied to the input terminal on the positive side with a magnitude of one of the threshold voltages Vth11, Vth12, Vth21, and Vth22 supplied to the input terminal on the negative side. Accordingly, the above-described detection result signal J(S2), J(S21), or J(S22) (for example, a binary signal of "L (low)" or "H (high)" corresponding to the comparison result) as a comparison result is output from the output terminal of the comparator 53. Note that the detail of the comparison operation between the detection voltages V(S2), V(S21), and V(S22) and the threshold voltages Vth11, Vth12, Vth21, and Vth22 will be described later (FIG. 10).

Incidentally, the configuration of the voltage detection sections 233, 233A, and 233B is not limited to the configuration illustrated in FIG. 7. Specifically, for example, a circuit configuration in which a predetermined digital processing is performed after the input signal S2 (an analog signal) is converted into a digital signal by an A/D (analog/digital) converter may be available.

[Functions and Effects of Transmission System 4]
(1. Outline of General Operation)

In the transmission system 4, the power-transmission operation section 11 of the feed unit 1 supplies a predetermined high frequency power (AC signal) for performing power transmission to the common coil L1. As a result, a magnetic field (magnetic flux) is generated in the common coil L1. At this time, when the electronic apparatuses 2A and 2B as units to be fed with power (units to be charged) are placed (or closely disposed) on the top surface (the feeding surface) of the feed unit 1, the common coil L1 in the feed unit 1 and the common coil L2 of the electronic apparatuses 2A and 2B come close to each other near the feeding surface.

In this way, when the common coil L2 is closely disposed to the common coil L1 from which the magnetic field (magnetic flux) is generated, electromotive force is generated in the common coil L2 by induction of the magnetic flux generated from the common coil L1. In other words, interlinkage magnetic field is generated in each of the coil L1 and the coil L2 by electromagnetic induction or magnetic resonance. As a result, power is transmitted (fed) from the common coil L1 side (primary side, the feed unit 1 side) to the common coil L2 side (secondary side, the electronic apparatuses 2A and 2B side) (see power P1 illustrated in FIG. 2). At this time, on the feed unit 1 side, for example, LC resonance operation using the common coil L1 and a capacitor (not shown) is performed, and on the electronic apparatuses 2A and 2B side, LC resonance operation using the common coil L2 and a capacitor (not shown) is performed.

Then, in the electronic apparatuses 2A and 2B, the following charging operation is performed in the power-reception operation section 21, based on the power (AC power) received by the common coil L2. With the charging section 212, the battery 213 is charged after the AC power is converted into a predetermined DC power, for example. In this way, in the electronic apparatuses 2A and 2B, the charging operation based on the power received by the common coil L2 is performed.

Specifically, in the embodiment, terminal connection to the AC adaptor or the like is not necessary for charging the electronic apparatuses 2A and 2B, and charging is easily started (non-contact feeding is performed) by only placing (or closely disposing) the electronic apparatuses 2A and 2B on the feeding surface of the feed unit 1. This leads to liability relief of a user.

Moreover, in the transmission system 4, as illustrated by the arrow D1 in FIG. 2, non-contact mutual data transmission is performed between the data-transmission operation section 12 in the primary-side unit (the feed unit 1) and the data-transmission operation section 22 in the secondary-side unit (the electronic apparatuses 2A and 2B), with use of a magnetic field. Specifically, when the common coil L1 in the feed unit 1 and the common coil L2 in the electronic apparatuses 2A and 2B come close to each other, mutual data transmission with use of a magnetic field is performed. Accordingly, data transmission is allowed to be performed only by allowing the feed unit 1 and the electronic apparatuses 2A and 2B to come close to each other, without connecting wirings for data transmission between the feed unit 1 and the electronic apparatuses 2A and 2B. In other words, liability relief of a user is achievable in this point.

(2. Switching Control Operation of Changeover Switches SW1 and SW2)

Next, control operation (switching control operation) of the changeover switches SW1 and SW2 by the switch control section 23 that is one of features of the embodiment will be described in detail with comparing to comparative examples (comparative examples 1 and 2).

Comparative Example 1

FIG. 8 illustrates a block configuration of a transmission system (a transmission system 104) according to a comparative example 1. The transmission system 104 of the comparative example 1 includes the feed unit 1 and two electronic apparatuses 102A and 102B.

Each of the electronic apparatuses 102A and 102B includes the power-reception operation section 21, the data-transmission operation section 22, a power-reception coil L21, and a data-transmission coil L22. In other words, different from the common coil L2 in the electronic apparatuses 2A and 2B of the embodiment, the power-reception coil L21 and the data-transmission coil L22 are separately provided.

The power-reception coil L21 and the data-transmission coil L22 are separately provided in this way for the following reason. Transmission is basically performed in accordance with the same principle (with use of a magnetic field) in two non-contact transmission systems (power transmission system and data transmission system). However, the following two large different points are present between the systems.

Firstly, the applied power (voltage) is largely different between the systems. Specifically, in the non-contact data-transmission system (NFC), the received power is a power necessary for driving an IC (integrated circuit) (about several mW to about several tens mW), whereas in the non-contact power-transmission system, the received power is about several W. Therefore, voltage resistance of the IC in the system is also largely different, and when a voltage equivalent to the voltage applied to the power transmission system is applied to the data transmission system, the circuit is possibly damaged by overvoltage.

Secondly, the applied frequency is largely different between the systems (the feed frequency f1 and the data-transmission frequency f2 are different from each other) as described with referring to (A) and (B) of FIG. 4. Specifically, in the non-contact data transmission system (NFC), the use of a carrier having the data-transmission frequency f2 of 13.56 MHz is defined by international standard. On the other hand, in the non-contact power-transmission system, a frequency is selected from the viewpoint of regulations, efficiency, and the like, due to large power in feeding. For example, in the non-contact power-transmission system, if the frequency (the feed frequency f1) is high, loss in the circuit is increased and the degree of efficiency reduction (feed efficiency and the like) is possibly increased. Therefore, in the present circumstances, as the feed frequency f1, a frequency of around 120 kHz or around 6.78 MHz is supported by standardization associations.

Caused by the difference of the system configuration between in the power-transmission system and in the data-transmission system, in the transmission system 104 of the comparative example 1, the power-reception coil L21 and the data-transmission coil L22 are separately provided as described above. However, when these coils are provided separately, its manufacturing cost and its mounting area are largely restricted. In other words, in the comparative example 1, it is difficult to achieve cost reduction and downsizing.

Comparative Example 2

On the other hand, a transmission system (a transmission system 204) according to a comparative example 2 illustrated in FIG. 9 includes the feed unit 1 and two electronic apparatuses 202A and 202B each including the common coil L2. Specifically, in the comparative example 2, the common coil L2 commonly used as the power-reception coil and the data-transmission coil is employed so that the number (kinds) of coils is reduced compared with the comparative example 1, and cost reduction and downsizing are achieved.

Each of the electronic apparatuses 202A and 202B includes the power-reception operation section 21, the data-transmission operation section 22, the common coil L2, the changeover switches SW1 and SW2, and a switch control section 203. In other words, each of the electronic apparatuses 202A and 202B is configured by providing the switch control section 203 in the electronic apparatuses 2A and 2B of the embodiment, in place of the switch control section 23.

The switch control section 203 includes the impedance matching circuit 231, the voltage detection section 233, and the control section 234. In other words, the switch control section 203 is configured by removing (not providing) the BPFs 232A and 232B and the voltage detection sections 233, 233A, and 233B from the switch control section 23. Therefore, the switch control section 203 generates and outputs the control signals CTL1 and CTL2, based on the detection result signal J(S2) (a detection result of the entire signal S2) by the voltage detection section 233, thereby performing the switching control of the changeover switches SW1 and SW2.

Incidentally, the transmission system 204 of the comparative example 2 has disadvantages as follows. The switching control operation is performed only using the detection result of the entire signal S2. Therefore, for example, when the signal S2 having high signal level (voltage) is applied abruptly, there is a possibility that the circuit in the data-transmission operation section 22 is still in a valid state (the changeover switch SW2 is in the ON state). Therefore, when the data-transmission operation section 22 is in the valid state, if the mode is switched from the data transmission mode to the power transmission mode on the feed unit 1 side, the circuit in the data-transmission operation section 22 is possibly damaged by overvoltage.

As a method of preventing a circuit from being damaged by such overvoltage, a method in which the voltage is decreased (overvoltage is prevented from being applied) by providing load resistances in the electronic apparatuses 202A and 202B so that the voltage is varied according to (by following) the positional relationship between the feed unit 1 and the electronic apparatuses 202A and 202B is considered. However, even if the method is employed, it is difficult for the method to handle the case where the unexpected high voltage is abruptly applied, and in such a case, it is considered that the circuit is damaged before the voltage follows.

As described above, in the comparative examples 1 and 2, it is difficult to achieve cost reduction and downsizing as well as to improve safety at the time of power transmission and data transmission with use of a magnetic field.

Embodiment

In contrast, in the electronic apparatuses 2A and 2B of the embodiment, the switch control section 23 performs control operation (switching control operation) of the changeover switches SW1 and SW2 in the following manner. The switch control section 23 performs such switching control, based on the detection results with taking account of the frequency components of the signal S2 received by the common coil L2 from the outside (the feed unit 1). In other words, the switching control operation is performed not by using only the detection results of the entire signal S2 like in the comparative example 2, but by taking account of the frequency components of the signal S2.

More specifically, the switch control section 23 performs switching control based on the magnitude of the signal level of each of the frequency component for the power transmission and the frequency component for the data transmission in the signal S2. In addition, at this time, the switch control section 23 performs such switching control with use of a comparison result of the signal level of each of the frequency component for the power transmission and the frequency component for the data transmission (each component of the feed frequency f1 and the data-transmission frequency f2 in the signal S2) and predetermined threshold voltages Vth21 and Vth22 (carrier thresholds), as will be described later.

In the embodiment, unlike the comparative example 2, with such a switching control operation, the circuit (for example, the circuit in the data-transmission operation section 22) is prevented from being damaged by the difference between the system configuration at the time of the power transmission and the system configuration at the time of the data transmission.

FIG. 10 is a flowchart illustrating an example of the switching control operation by the switch control section 23 of the embodiment.

In this example, first, the voltage detection section 233 in the switch control section 23 detects the detection voltage V(S2) as the signal level of the entire signal S2 (step S101). Then, the voltage detection section 233 determines whether the detection voltage V(S2) is larger than the predetermined threshold voltage Vth11 (a first entire threshold) (V(S2) >Vth11), or the voltage detection section 233 compares the magnitudes of the voltage values (step S102).

At this time, when the detection voltage V(S2) is larger than the threshold voltage Vth11 (V(S2)>Vth11) (step S102: Y), the control section 234 performs a predetermined error processing, based on the detection result signal J(S2) indicating the determination result (step S103). Specifically, in this case, the control section 234 determines that a high voltage not performing the power transmission and the data transmission is applied, and controls the process to be returned to a first process (step S101) without performing switching control described below. On the other hand, when the detection voltage V(S2) is equal to or lower than the threshold voltage Vth11 (V(S2)≤Vth11) (step S102: N), the voltage detection sections 233A and 233B each then detect the signal level of the frequency components of the signal S2 (step S104). Specifically, the voltage detection section 233A detects the detection voltage V(S21) as a signal level of the component (signal S21) of the feed frequency f1 in the signal S2. In addition, the voltage detection section 233B detects the detection voltage V(S22) as a signal level of the component (signal S22) of the data-transmission frequency f2 in the signal S2. Then, the voltage detection section 233A determines whether the detection voltage V(S21) is equal to or larger than the predetermined threshold voltage Vth21 (the first carrier threshold) (V(S21)≥Vth21), or the voltage detection section 233A compares the magnitudes of the voltage values (step S105).

In this way, only when the signal level of the entire signal S2 is equal to or smaller than the threshold voltage Vth11 (step S102: N), the switch control section 23 performs comparison between the detection voltage V(S21) and the threshold voltage Vth21 (step S105) and switching control of the changeover switches SW1 and SW2, which will be described below. Accordingly, the circuits and the like in the power-reception operation section 21 and the data transmission section 22 are prevented from being damaged by the abrupt high voltage application.

At this time, when the detection voltage V(S21) is equal to or larger than the threshold voltage Vth21 (V(S21)

≥Vth21) (step S105: Y), the control section 234 outputs the control signal CTL1 to allow the changeover switch SW1 to be in the ON state, based on the detection result signal J(S21) indicating the determination result. Accordingly, a period during which the changeover switch SW1 is in the ON state is established, that is, the mode is changed into the power transmission mode (feeding mode) in which the operation of the power-reception operation section 21 is in the valid state (step S106). After that, the process returns to the first process (step S101). On the other hand, when the detection voltage V(S21) is smaller than the threshold voltage Vth21 (V(S21)<Vth21) (step S105: N), the control section 234 outputs the control signal CTL1 to allow the changeover switch SW1 to be in the OFF state (step S107). Then, the voltage detection section 233B determines whether the detection voltage V(S22) is equal to or larger than the predetermined threshold voltage Vth22 (the second carrier threshold) (V(S22)≥Vth22), or the detection voltage section 233B compares the magnitudes of the voltage values (step S108).

At this time, when the detection voltage V(S22) is equal to or larger than the threshold voltage Vth22 (V(S22) ≥Vth22) (step S108: Y), the voltage detection section 233 performs comparison of the magnitudes of the voltage values described below. Specifically, the voltage detection section 233 determines whether the detection voltage V(S2) is larger than the predetermined threshold voltage Vth12 (a second entire threshold) (V(S2)>Vth12) (step S109). Note that the threshold voltage Vth12 is smaller than the above-described threshold voltage Vth11, in other words, the threshold voltage Vth11 is larger than the threshold voltage Vth12 (Vth12<Vth11). On the other hand, when the detection voltage V(S22) is smaller than the threshold voltage Vth22 (V(S22)<Vth22) (step S108: N), the control section 234 outputs the control signal CTL2 to allow the changeover switch SW2 to be in the OFF state, based on the detection result signal J(S22) indicating the determination result (step S110).

At this time, when the detection voltage V(S2) is larger than the threshold voltage Vth12 (V(S2)>Vth12) (step S109: Y), the control section 234 outputs the control signal CTL2 to allow the changeover switch SW2 to be in the OFF state, based on the detection result signal J(S2) indicating the determination result (step S110). On the other hand, when the detection voltage V(S2) is equal to or smaller than the threshold voltage Vth12 (V(S2)≤Vth12) (step S109: N), the control section 234 outputs the control signal CTL2 to allow the changeover switch SW2 to be in the ON state. As a result, a period during which the changeover switch SW2 is in the ON state is established, that is, the mode is changed into the data transmission mode (communication mode) in which the operation of the data-transmission operation section 22 is in the valid state (step S111). After that, the process returns to the first process (step S101).

In this way, when the detection voltage V(S22) is equal to or larger than the threshold voltage Vth22 (step S108: Y) and only in the case where the detection voltage V(S2) is equal to or smaller than the threshold voltage Vth12 (step S109: N), the switch control section 23 controls the changeover switch SW2 to be in the ON state. Accordingly, the circuit (the circuit in the data-transmission operation section, and the like) is prevented from being damaged by the difference between the system configuration (configuration of the power-reception operation section 21) at the time of the power transmission and the system configuration (configuration of the data-transmission operation section 22) at the time of data transmission.

Subsequently, after the step S110, whether the entire control processing (switching control operation) by the switch control section 23 is allowed to be ended is determined (step S112). Then, when it is determined that the control processing is allowed not to be ended (step S112: N), the process returns to the first process (step S101), and when it is determined that the control processing is allowed to be ended (step S112: Y), the entire control processing illustrated in FIG. 10 is ended.

In this way, in the embodiment, with use of the common coil L2, the power transmitted through the power transmission with use of a magnetic field is received, and the mutual data transmission with use of a magnetic field is performed. Specifically, since both the power reception operation and the data transmission operation are performed with use of single common coil L2, the number (kinds) of coils is allowed to be reduced, compared with the case where these operations are performed with use of the dedicated coils (the power reception coil L21 and the data transmission coil L22) like the above-described comparative example 1.

Moreover, the switching control of ON/OFF state of each of the changeover switch SW1 on the path between the common coil L2 and the power-reception operation section 21 and the changeover switch SW2 on the path between the common coil L2 and the data-transmission operation section 22 is performed based on the detection results with taking account of the frequency components of the signal S2 received by the common coil L2 from the outside (the feed unit 1). As a result, unlike the above-described comparative example 2, the circuit (the circuit in the data-transmission operation section 22, and the like) is prevented from being damaged by the difference between the system configuration at the time of the power transmission and the system configuration at the time of the data transmission.

Specifically, as described above, for example, in the case where the high voltage signal S2 is abruptly applied, even when the circuit in the data-transmission operation section 22 is still in the valid state (the changeover switch SW2 is in the ON state), such a damage of the circuit is avoided. In other words, in such a case, it is expected that the signal level (the voltage V(S22)) of the component of the data-transmission frequency f2 in the signal S2 is dropped at the moment when the mode is changed from the data transmission mode to the power transmission mode on the feed unit 1 side. Therefore, the switching control is performed to allow the changeover switch SW2 to be in the OFF state.

As described above, in the embodiment, with use of the common coil L2, the power transmitted through the power transmission with use of a magnetic field is received, and the mutual data transmission with use of a magnetic field is preformed. Therefore, the number (kinds) of coils is allowed to be reduced, and cost reduction and downsizing are achievable. In addition, the switching control of the ON/OFF state of the changeover switch SW1 on the path between the common coil L2 and the power-reception operation section 21 and the changeover switch SW2 on the path between the common coil L2 and the data-transmission operation section 22 is performed based on the detection results with taking account of the frequency components of the signal S2 received by the common coil L2 from the outside (the feed unit 1). As a result, the circuit is prevented from being damaged by the difference between the system configuration at the time of the power transmission and the system configuration at the time of the data transmission, thereby improving safety. Consequently, at the time of performing the power transmission and the data transmission with use of a magnetic field, safety is allowed to be improved while cost reduction and downsizing are achieved.

Moreover, the value of the feed frequency f1 is allowed to be selectable, and the circuit in each of the power transmission system and the data transmission system is allowed to use the existing IC as it is (change of the design or the like is not necessary).

[Modifications]

Hereinbefore, although the technology of the disclosure has been described with referring to the embodiment, the technology is not limited to the embodiment, and various modifications may be made.

For example, various kinds of configurations are allowed to be used as the configuration (shape) of each coil (common coil) described in the embodiment. Specifically, each coil is allowed to be configured in shapes such as a spiral shape, a loop shape, a bar shape using a magnetic body, an alpha-wound shape configured by folding a spiral coil into two layers, a multilayer spiral shape, a helical shape configured by winding a wire in a thickness direction thereof. Moreover, each coil is not limited to a winding coil configured of a conductive wire rod, and may be a conductive patterned coil configured of a printed board, a flexible printed board, or the like.

In addition, in the above-described embodiment, although the electronic apparatus has been described as an example of a unit to be fed with power, the unit to be fed with power is not limited thereto, and may be other than the electronic apparatus (for example, vehicles such as electric cars).

Furthermore, in the above-described embodiment, the components of each of the feed unit and the electronic apparatuses have been specifically described. However, all of the components are not necessarily provided, and other components may be further provided. For example, in the feed unit or the electronic apparatus, a communication function, a control function, a display function, a function of authenticating a secondary-side unit, a function of determining whether a secondary-side unit is placed on a primary-side unit, a function of detecting a contaminant such as a dissimilar metal, and the like may be provided. Moreover, in the feed unit, a single common coil like in the above-described embodiment is not provided, but a power transmission coil and a data transmission coil may be provided separately.

In addition, in the above-described embodiment, the case where the transmission system includes a plurality of (two) electronic apparatuses has been described as an example. However, the number of electronic apparatuses is not limited thereto, and the transmission system may include only one electronic apparatus.

Moreover, in the above-described embodiment, the charging tray for a small electronic apparatus (CE device) such as a mobile phone has been described as an example of the feed unit. However, the feed unit is not limited to such a household charging tray, and is applicable as a charging unit for various electronic apparatuses, and the like. In addition, the feed unit is not necessarily a tray, and may be a stand for electronic apparatuses such as a so-called cradle.

In one embodiment, an electronic apparatus includes a switch control section configured to: determine whether a received signal is any one of a power signal and a data signal based on the received signal, and select any one of a power-reception operation and a data-transmission operation based on the determination of the received signal. In an embodiment, the electronic apparatus further includes a coil electrically connected to the switch control section thereby allowing selection of any one of the power-reception operation and the data-transmission operation. In an embodiment, the coil is configured to be electromagnetically coupled to a second coil of a feed unit to wirelessly receive any one of the power signal and the data signal from the feed unit. In an embodiment, the electronic apparatus includes a mobile electronic apparatus and the battery is a rechargeable battery. In an embodiment, the data-transmission operation is configured to transmit signals generated by a signal supply source. In an embodiment, the switch control section includes: a first filter configured to filter the received signal associated with a first frequency component; a first voltage detection circuit configured to determine if the first frequency component exceeds a first voltage threshold; a second filter configured to filter the received signal associated with a second frequency component; and a second voltage detection circuit configured to determine if the second frequency component exceeds a second voltage threshold, and wherein the switch control section is configured to determine that the received signal is to be transmitted to: a power-reception operation section if the first voltage detection circuit determines the first frequency component exceeds the first voltage threshold; and a data-transmission operation section if the second voltage detection circuit determines the second frequency component exceeds the second voltage threshold. In an embodiment, the electronic apparatus further includes a third voltage detection circuit configures to determine if the received signal exceeds a third voltage threshold. In an embodiment, the switch control section performs error processing if the third voltage detection circuit determines the received signal exceeds the third voltage threshold. In an embodiment, error processing includes the control section refraining from transmitting the received wireless signal to any one of the power-reception operation section and the data-transmission operation section. In an embodiment, the first voltage detection circuit includes: a first rectification circuit to convert the first frequency component into a first direct current signal; and a first comparator to determine if a magnitude first direct current signal exceeds a magnitude of the first voltage threshold; and the second voltage detection circuit includes: a second rectification circuit to convert the second frequency component into a second direct current signal; and a second comparator to determine if a magnitude the second direct current signal exceeds a magnitude the second voltage threshold. In an embodiment, the switch control section is configured to: transmit a first control signal to a first switch causing the first switch to route the received signal to the power-reception operation section if the first frequency component exceeds the first voltage threshold; and transmit a second control signal to a second switch causing the second switch to route the received signal to the data-transmission operation section if the second frequency component exceeds the second voltage threshold. In an embodiment, the switch control section is configured to be prevented from outputting the first control signal simultaneously with the second control signal. In an embodiment, the first filter is configured to filter the received signal for frequencies substantially around 120 kilohertz (kHz) or 6.78 megahertz (MHz). In an embodiment, the first filter is configured to be selectable between frequencies substantially around 120 kilohertz (kHz) or 6.78 megahertz (MHz). In an embodiment, the second filter is configured to filter the received signal for frequencies substantially around 13.56 megahertz (MHz). In an embodiment, the switch control section is configured to perform switching control by selecting any one of a power-reception operation and a data-transmission operation based on a magnitude of a signal level of the received signal of each of a frequency component for the power transmission and a frequency component for the data transmission in the signal. In an embodiment, the switch control section performs the switching control with use of comparison results between a predetermined carrier threshold and the signal level of each of the frequency component for the power transmission and the frequency component for the data transmission. In an embodiment, the switch control section controls a first changeover switch to be in the ON state when the signal level of the frequency component for the power transmission is equal to or larger than a first carrier threshold, and controls the first changeover switch to be in the OFF state when the signal level of the frequency component for the power transmission is smaller than the first carrier threshold.

In another embodiment, a method of routing a received wireless signal based on a frequency is provided. The method includes: receiving a signal wirelessly from a feed unit via magnetic inductance; applying a first filter to the received signal to generate a first frequency component; applying a second filter to the received signal to generate a second frequency component; routing the received signal to a power-reception operation section if a magnitude of the first frequency component exceeds a first voltage threshold; and routing the received signal to a data-transmission operation section if a magnitude of the second frequency component exceeds a second voltage threshold. In an embodiment, the method further includes: determining whether the received signal is greater than a third voltage threshold prior to routing the received signal; and performing error processing on the received signal if the received signal is greater than the third voltage threshold. In an embodiment, error processing includes routing the received signal to a ground potential instead of routing the received signal to the data-transmission operation section or the power-reception operation section. In an embodiment, the received signal and subsequent received signals are routed to the power-reception operation section so long as a magnitude of the first frequency component of the subsequent received signals exceeds the first voltage threshold. In an embodiment, the received signal and subsequent received signals are routed to the data-transmission operation section so long as a magnitude of the second frequency component of the subsequent received signals exceeds the second voltage threshold and a magnitude of the first frequency component of the subsequent received signals is less than the first voltage threshold.

In another embodiment, an electronic system includes: a transmitter configured to wirelessly transmit a power signal and a data signal; an electronic device wirelessly communicatively coupled to the transmitter, the electronic device including: a switch control section to: determine whether a signal received from the transmitter is the power signal or the data signal based on a frequency component of the received signal; and select any one of a power-reception operation and a data-transmission operation based on the determination of the received signal. In an embodiment, the electronic device includes an induction coil that is electromagnetically coupled to a second induction coil included within the transmitter. In an embodiment, the transmitter is a charging tray. In an embodiment, the transmitter includes a detection circuit configured to detect a second data signal from the electronic device. In an embodiment, the transmitter suspends transmitting the power signal when the detection circuit detects the second data signal.

Note that the technology may be configured as follows.
(1) An electronic apparatus including:
a common coil;
a power-reception operation section using the common coil to receive power transmitted through power transmission with use of a magnetic field;
a data-transmission operation section using the common coil to perform mutual data transmission with use of a magnetic field;
a first changeover switch disposed on a path between the common coil and the power-reception operation section;
a second changeover switch disposed on a path between the common coil and the data-transmission operation section; and
a switch control section performing switching control of ON/OFF state of each of the first and second changeover switches, based on detection results with taking account of frequency components of a signal received by the common coil from outside.

(2) The electronic apparatus according to (1), wherein the switch control section performs the switching control, based on a magnitude of a signal level of each of a frequency component for the power transmission and a frequency component for the data transmission in the signal.

(3) The electronic apparatus according to (2), wherein the switch control section performs the switching control with use of comparison results between a predetermined charier threshold and the signal level of each of the frequency component for the power transmission and the frequency component for the data transmission.

(4) The electronic apparatus according to (3), wherein the switch control section controls the first changeover switch to be in the ON state when the signal level of the frequency component for the power transmission is equal to or larger than a first carrier threshold, and controls the first changeover switch to be in the OFF state when the signal level of the frequency component for the power transmission is smaller than the first carrier threshold.

(5) The electronic apparatus according to (4), wherein the switch control section performs comparison between the signal level of the frequency component for the power transmission and the first carrier threshold only when the signal level of the entire signal is equal to or smaller than a first entire threshold.

(6) The electronic apparatus according to any one of (3) to (5), wherein the switch control section performs comparison between the signal level of the entire signal and a second entire threshold when the signal level of the frequency component for the data transmission is equal to or larger than a second carrier threshold, and controls the second changeover switch to be in the OFF state when the signal level of the frequency component for the data transmission is smaller than the second carrier threshold.

(7) The electronic apparatus according to (6), wherein the switch control section controls the second changeover switch to be in the ON state when the signal level of the frequency component for the data transmission is equal to or larger than the second carrier threshold and only when the signal level of the entire signal is equal to or smaller than the second entire threshold.

(8) The electronic apparatus according to (6) or (7), wherein the switch control section performs the switching control only when the signal level of the entire signal is equal to or smaller than a first entire threshold, the first entire threshold being larger than the second entire threshold.

(9) The electronic apparatus according to any one of (2) to (8), wherein the switch control section includes:
a first filter extracting the frequency component for the power transmission from the signal;

a second filter extracting the frequency component for the data transmission from the signal;
a first detection section detecting a signal level of the entire signal;
a second detection section detecting a signal level of the frequency component for the power transmission extracted by the first filter;
a third detection section detecting a signal level of the frequency component for the data transmission extracted by the second filter; and
a control section performing the switching control, based on detection results by the first to third detection sections.

(10) The electronic apparatus according to any one of (1) to (9), wherein
a power transmission mode allowing the operation of the power-reception operation section to be valid is established during a period in which the first changeover switch is in the ON state, and
a data transmission mode allowing the operation of the data-transmission operation section to be valid is established during a period in which the second changeover switch is in the ON state.

(11) A transmission system including one or more electronic apparatuses and a feed unit, the feed unit performing power transmission to the electronic apparatuses with use of a magnetic field and performing mutual data transmission with the electronic apparatuses, each of the electronic apparatuses including:
a common coil;
a power-reception operation section using the common coil to receive power transmitted through the power transmission;
a data-transmission operation section using the common coil to perform the data transmission;
a first changeover switch disposed on a path between the common coil and the power-reception operation section;
a second changeover switch disposed on a path between the common coil and the data-transmission operation section; and
a switch control section performing switching control of ON/OFF state of each of the first and second changeover switches, based on detection results with taking account of frequency components of a signal received by the common coil from the feed unit.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:
1. An electronic apparatus comprising:
a switch control section configured to:
determine whether a received signal is any one of a power signal and a data signal based on the received signal; and
select any one of a power-reception operation and a data-transmission operation based on the determination of the received signal,
wherein the switch control section is configured to perform switching control by selecting any one of the power-reception operation and the data-transmission operation based on a magnitude of a signal level of the received signal of each of a frequency component for power transmission and a frequency component for data transmission in the signal.

2. The electronic apparatus of claim 1, further comprising a coil electrically connected to the switch control section thereby allowing selection of any one of the power-reception operation and the data-transmission operation.

3. The electronic apparatus of claim 2, further comprising wherein the coil is configured to be electromagnetically coupled to a second coil of a feed unit to wirelessly receive any one of the power signal and the data signal from the feed unit.

4. The electronic apparatus of claim 1, wherein the electronic apparatus includes a mobile electronic apparatus with a rechargeable battery.

5. The electronic apparatus of claim 1, wherein the data-transmission operation is configured to transmit signals generated by a signal supply source.

6. An electronic apparatus comprising:
a switch control section configured to:
determine whether a received signal is any one of a power signal and a data signal based on the received signal; and
select any one of a power-reception operation and a data-transmission operation based on the determination of the received signal,
wherein the switch control section includes:
a first filter configured to filter the received signal associated with a first frequency component;
a first voltage detection circuit configured to determine if the first frequency component exceeds a first voltage threshold;
a second filter configured to filter the received signal associated with a second frequency component; and
a second voltage detection circuit configured to determine if the second frequency component exceeds a second voltage threshold, and
wherein the switch control section is configured to determine that the received signal is to be transmitted to:
a power-reception operation section if the first voltage detection circuit determines that the first frequency component exceeds the first voltage threshold; and
a data-transmission operation section if the second voltage detection circuit determines that the second frequency component exceeds the second voltage threshold.

7. The electronic apparatus of claim 6, further comprising a third voltage detection circuit configured to determine if the received signal exceeds a third voltage threshold.

8. The electronic apparatus of claim 7, wherein the switch control section performs error processing if the third voltage detection circuit determines that the received signal exceeds the third voltage threshold.

9. The electronic apparatus of claim 8, wherein error processing includes the control section refraining from transmitting the received wireless signal to any one of the power-reception operation section and the data-transmission operation section.

10. The electronic apparatus of claim 6, wherein:
the first voltage detection circuit includes:
a first rectification circuit to convert the first frequency component into a first direct current signal; and
a first comparator to determine if a magnitude of the first direct current signal exceeds a magnitude of the first voltage threshold; and
the second voltage detection circuit includes:

a second rectification circuit to convert the second frequency component into a second direct current signal; and a second comparator to determine if a magnitude of the second direct current signal exceeds a magnitude the second voltage threshold.

11. The electronic apparatus of claim 6, wherein the switch control section is configured to:

transmit a first control signal to a first switch causing the first switch to route the received signal to the power-reception operation section if the first frequency component exceeds the first voltage threshold; and transmit a second control signal to a second switch causing the second switch to route the received signal to the data-transmission operation section if the second frequency component exceeds the second voltage threshold.

12. The electronic apparatus of claim 11, wherein the switch control section is configured to be prevented from outputting the first control signal simultaneously with the second control signal.

13. The electronic apparatus of claim 6, wherein the first filter is configured to filter the received signal for frequencies substantially around 120 kilohertz (kHz) or 6.78 megahertz (MHz).

14. The electronic apparatus of claim 13, wherein the first filter is configured to be selectable between frequencies substantially around 120 kilohertz (kHz) or 6.78 megahertz (MHz).

15. The electronic apparatus of claim 6, wherein the second filter is configured to filter the received signal for frequencies substantially around 13.56 megahertz (MHz).

16. The electronic apparatus of claim 1, wherein the switch control section performs the switching control with use of comparison results between a predetermined carrier threshold and the signal level of each of the frequency component for the power transmission and the frequency component for the data transmission.

17. The electronic apparatus of claim 16, wherein the switch control section controls a first changeover switch to be in the ON state when the signal level of the frequency component for the power transmission is equal to or larger than a first carrier threshold, and controls the first changeover switch to be in the OFF state when the signal level of the frequency component for the power transmission is smaller than the first carrier threshold.

18. A method of routing a received wireless signal based on a frequency comprising:

receiving a signal wirelessly from a feed unit via magnetic inductance;

applying a first filter to the received signal to generate a first frequency component;

applying a second filter to the received signal to generate a second frequency component;

routing the received signal to a power-reception operation section if a magnitude of the first frequency component exceeds a first voltage threshold; and routing the received signal to a data-transmission operation section if a magnitude of the second frequency component exceeds a second voltage threshold.

19. The method of claim 18, further comprising:

determining whether the received signal is greater than a third voltage threshold prior to routing the received signal; and performing error processing on the received signal if the received signal is greater than the third voltage threshold.

20. The method of claim 19, wherein error processing includes routing the received signal to a ground potential instead of routing the received signal to the data-transmission operation section or the power-reception operation section.

21. The method of claim 18, wherein the received signal and subsequent received signals are routed to the power-reception operation section so long as a magnitude of the first frequency component of the subsequent received signals exceeds the first voltage threshold.

22. The method of claim 18, wherein the received signal and subsequent received signals are routed to the data-transmission operation section so long as a magnitude of the second frequency component of the subsequent received signals exceeds the second voltage threshold and a magnitude of the first frequency component of the subsequent received signals is less than the first voltage threshold.

23. An electronic system comprising:

a transmitter configured to wirelessly transmit a power signal and a data signal;

an electronic device wirelessly communicatively coupled to the transmitter, the electronic device including:

a switch control section to:

determine whether a signal received from the transmitter is the power signal or the data signal based on a frequency component of the received signal; and select any one of a power-reception operation and a data-transmission operation based on the determination of the received signal.

24. The electronic system of claim 23, wherein the electronic device includes an induction coil that is electromagnetically coupled to a second induction coil included within the transmitter.

25. The electronic system of claim 23, wherein the transmitter is a charging tray.

26. The electronic system of claim 23, wherein the transmitter includes a detection circuit configured to detect a second data signal from the electronic device.

27. The electronic system of claim 26, wherein the transmitter suspends transmitting the power signal when the detection circuit detects the second data signal.

* * * * *